No. 771,760.

Patented October 4, 1904.

UNITED STATES PATENT OFFICE.

DAVID M. BALCH, OF CORONADO, CALIFORNIA.

PROCESS OF TREATING SEAWEED.

SPECIFICATION forming part of Letters Patent No. 771,760, dated October 4, 1904.

Application filed July 12, 1902. Serial No. 115,330. (No specimens.)

*To all whom it may concern:*

Be it known that I, DAVID M. BALCH, a citizen of the United States of America, residing at Coronado, in the county of San Diego and State of California, have invented a certain new and useful Improvement in the Treatment of Fuci to Obtain Valuable Products, of which the following is a specification.

My invention relates to an improvement in the treatment of fuci or seaweed to obtain valuable products therefrom.

The large growing fuci of the Pacific coasts and seaweeds in general, though containing much combustible material, cannot be used as fuel in their natural state for two reasons at least: First, when dried the seaweed will reabsorb moisture greedily, when of course they will not burn, and, second, however dry the seaweed may be, the large percentage of alkaline salts contained thereby makes their combustion at such a time feeble and imperfect. Again, seaweed in its natural state cannot be advantageously utilized in commerce as a fertilizer: first, because it is very difficult to pulverize, compact, and get into a merchantable condition, and, second, because the material when so treated is so hydroscopic that it speedily becomes moist, coherent, and lumpy.

To remove these difficulties and prepare the seaweed for utilization for purposes stated above, I have invented and worked out the following process.

The seaweed gathered from the beds where they grow or collected where stranded are partially sun-dried. The time required for this operation depends largely, of course, upon the locality and climate. On the sunny Pacific coasts, where for much of the year it is virtually rainless, a single day's exposure is ofttimes sufficient for the removal of much of the moisture and superfluous weight of the weed. The seaweed thus partially air-dried may be loaded upon cars, which when loaded are run into large chambers suitably constructed, where the weeds are subjected to a carefully regulated temperature sufficient to cause the parching, but not the burning, charring, or waste, of the organic constituents of the seaweed. This temperature may be produced in the chamber by means of outside heating, by superheated steam, by resistance-coils, by a current of hot air, which I prefer, or in any other convenient manner. The best results are obtained by employing a temperature of about 240° centigrade, gradually raised to about 270° centigrade, and a temperature about 250° centigrade has been found to be quite sufficient for my purpose, although a higher temperature can be employed without detriment to the product. The operation is analogous to that employed in parching or "roasting" peanuts or coffee, the object being to modify, but not disintegrate or destroy, the organic matter contained in the seaweed. The product which I obtain in this manner is something entirely new and previously unknown either in art or in nature, and this product might best be described as an "artificial saline humus," possessing many valuable properties and serving as a basis for at least three important articles of manufacture—to wit, prepared fuels, special fertilizers, and potassium compounds. By this parching process the nature of the material is entirely changed. The large stems of the air-dried fuci, which are tough, horny, and very difficult to pulverize, can now be disintegrated between the fingers, and the parched mass thus treated has ceased to be hydroscopic and is entirely suited to the purposes for which I utilize it. The parched material is withdrawn from the chambers and crushed between rollers or in a proper mill to about the fineness of sawdust. This operation is very speedy and requires but little power, its object being to reduce the bulk of the humus for the treatment thereof, as the material unground cannot so easily be deprived of its soluble salts. The material in this state can be marketed *per se* as a very cheap and efficient fertilizer, being rich in potassium salts and containing calcium and magnesium both as phosphates and in combination with organic acids. The material also contains nitrogenous substances, which as they decompose yield ammonia and other compounds of nitrogen to the soil. It is also possible to mix this product with the various substances required by certain crops in the manufacture of a number of special fertilizers.

In order to convert the parched and pulverized seaweed into a prepared fuel, it is necessary to remove the alkaline and other soluble salts present. I therefore work over the pulverized material and moisten it until it is slightly coherent. I then pack the moistened material into suitable vats or percolators and lixiviate with either hot or cold water. If the grinding has been so managed as to leave a granulated product without much fine dust, the material in the percolator will be rapidly exhausted. If the percolation is not sufficiently rapid, it may be hastened by any of the well-known methods. The clear liquid from the percolators is very rich in potassium salts, which may be recovered in any suitable manner. The exhausted material remaining in the percolators after lixiviation still contains the mineral salts of the weed insoluble in water. For certain grades of fuel these mineral salts are removed by treatment with dilute acids or by any of well-known methods. The fuel so treated will yield scarcely any ash. The exhausted material from the percolators, whether deprived of its mineral salts or not, is now fitted for the manufacture of prepared fuel. For this purpose it is dried by sun or kiln heat, and when dried, if desirable, it is mixed with any combustible material or used *per se*. In either case it is ground and thoroughly incorporated with some suitable binder—as coal-tar, for instance—in sufficient quantity to give it the required coherence. The mass is now compressed into blocks of suitable size and shape. These blocks are to be lightly furnaced for fuels of a certain grade. By varying the condition of the material and the pressure applied thereto I am enabled to obtain a fuel of the nature of wood, lignite, or coal. The ashes of this fuel are comparable with wood-ashes as a fertilizer.

It will be evident that changes might be made in the method herein set forth, and hence I do not wish to limit myself to the exact process herein set forth; but

What I claim as new, and desire to secure by Letters Patent, is—

1. The process of treating seaweed consisting in parching the material without burning or charring, granulating the parched material, lixiviating the granulent material, drying the exhausted residue, commingling the residue with a suitable binder, and shaping the mass into suitable forms.

2. The process of treating seaweed consisting in parching the material without burning or charring, granulating the parched material, moistening the granulent material, lixiviating the moistened material, drying the exhausted residue, commingling the exhausted residue with a suitable binder, and forming the mass into suitable shape.

3. The process of treating seaweed consisting in parching the material without burning or charring, granulating the parched material, lixiviating the granulated material, drying the exhausted residue, mixing the dried material with any suitable combustible, commingling the mixture with a suitable binder and shaping the mass into suitable forms.

4. The process of treating seaweed consisting in parching the material without burning or charring, granulating the parched material, lixiviating the granulent material, drying the exhausted residue, removing the mineral salts from the exhausted residue, commingling the residue with a suitable binder and forming the mass into suitable blocks.

5. The process of treating seaweed consisting in parching the material without burning or charring, granulating the parched material, lixiviating the granulent material, drying the exhausted residue, commingling the residue with a suitable binder, forming the mass into suitable blocks and lightly furnacing the blocks.

6. The process of treating seaweed consisting in parching the material without burning or charring, granulating the parched material, lixiviating the granulent material, drying the exhausted residue, removing the mineral salts from the exhausted residue, commingling the residue with a suitable binder, forming the mass into suitable blocks and lightly furnacing the blocks.

7. The process of treating seaweed consisting in partially drying the seaweed, parching the dried seaweed without charring or burning, reducing the parched material, moistening the reduced material, lixiviating the moistened material, drying the exhausted residue, commingling the dried residue with a suitable binder, and condensing the mass into suitable forms.

8. The process of treating seaweed consisting in parching the material without charring or burning, reducing the parched material, lixiviating the reduced material, removing the mineral salts from the exhausted material, drying the exhausted residue, commingling the dried residue with any suitable combustible material, commingling the mixture with a suitable binder, condensing the mass into suitable blocks and lightly furnacing the blocks.

9. The process of treating seaweed consisting in partially drying the material, parching the partially-dried material without burning or charring, reducing the parched material, lixiviating the reduced material, drying the exhausted residue, commingling the dried residue with any suitable binder, and condensing the mass into suitable blocks.

10. The process of treating seaweed consisting in parching the material without burning or charring, reducing the parched material, treating the reduced material with a sufficient quantity of water to dissolve the soluble salts therein contained, evaporating the resulting solution to dryness, drying the exhausted residue, commingling the dried residue with a suitable binder, and forming the mass into suitable blocks for use as fuel.

11. The process of treating seaweed consisting in parching the material without bringing it into actual contact with the source of heat, lixiviating the parched material to remove the soluble salts, the lixiviation resulting in the production of a clear liquid and an exhausted residuum and treating the residuum to obtain a fuel.

12. The process of treating seaweed consisting in parching the material without bringing it into actual contact with the source of heat, disintegrating the parched material, moistening the parched, disintegrated material, lixiviating the material to remove the soluble salts, the lixiviation resulting in separating the parched ground material into a clear liquid and an exhausted residue and treating the exhausted residue for the purpose of producing a fuel.

In witness that I claim the foregoing I have hereunto subscribed my name this 1st day of July, 1902.

DAVID M. BALCH.

Witnesses:
M. C. NICKELESON,
G. E. HARPHAM.